(12) United States Patent
Wolgast (10) Patent No.: US 11,186,375 B2
(45) Date of Patent: Nov. 30, 2021

(54) PASSENGER SEAT SYSTEM FOR A CABIN OF A MEANS OF TRANSPORTATION

(71) Applicant: Airbus Operations GmbH, Hamburg (DE)

(72) Inventor: Carsten Wolgast, Hamburg (DE)

(73) Assignee: Airbus Operations GmbH

( * ) Notice: Subject to any disclaimer, the term of this patent is extended or adjusted under 35 U.S.C. 154(b) by 354 days.

(21) Appl. No.: 16/302,909

(22) PCT Filed: May 31, 2017

(86) PCT No.: PCT/EP2017/063153
§ 371 (c)(1),
(2) Date: Nov. 19, 2018

(87) PCT Pub. No.: WO2017/207626
PCT Pub. Date: Dec. 7, 2017

(65) Prior Publication Data
US 2019/0315472 A1    Oct. 17, 2019

(30) Foreign Application Priority Data
May 31, 2016    (DE) .......................... 102016110057.9

(51) Int. Cl.
*B64D 11/06*    (2006.01)
(52) U.S. Cl.
CPC ........ *B64D 11/0696* (2013.01); *B64D 11/064* (2014.12); *B64D 11/0648* (2014.12)
(58) Field of Classification Search
CPC ............ B64D 11/0648; B64D 11/0696; B60N 2/005; B60N 2/015; B60N 2/01508;
(Continued)

(56) References Cited

U.S. PATENT DOCUMENTS

| 4,723,732 A | * | 2/1988 | Gorges | B64D 11/0696 |
| | | | | 104/165 |
| 4,911,381 A | * | 3/1990 | Cannon | B64D 11/0696 |
| | | | | 244/122 R |

(Continued)

FOREIGN PATENT DOCUMENTS

| CN | 105307937 A | 2/2016 |
| EP | 0463757 A2 | 1/1992 |
| WO | 2016049356 A1 | 3/2016 |

OTHER PUBLICATIONS

International Search Report from PCT/EP2017/063153, dated Sep. 12, 2017.
(Continued)

*Primary Examiner* — Joshua J Michener
*Assistant Examiner* — Arfan Y. Sinaki
(74) *Attorney, Agent, or Firm* — Lerner, David, Littenberg, Krumholz & Mentlik, LLP (57) ABSTRACT

A passenger seat system for a cabin of a means of transportation includes: a passenger seat having a seat frame having a holding section and a plurality of supporting elements for coupling to a floor; and, a slide device spaced apart from the holding section and having a base and a retaining device, to be detachably fastened to the base and be coupled to a supporting element. The base has a contact surface for laying onto a cabin seat rail, a locking device for locking the base on the seat rail, and a holding device for releasably holding the retaining device. The slide device is designed to lock the retaining device on the holding device selectively in a first or a second position or to release the retaining device and, when the retaining device is released, to permit motion of the retaining device between the first and the second positions.

11 Claims, 9 Drawing Sheets

(58) Field of Classification Search
CPC ............ B60N 2/01516; B60N 2/01525; B60N 2/0155; B60N 2/01558; B60N 2/01575; B60N 2/07; B60N 2/08
See application file for complete search history.

(56) References Cited

U.S. PATENT DOCUMENTS

| | | | | |
|---|---|---|---|---|
| 5,183,313 | A * | 2/1993 | Cunningham | B60N 2/242 248/429 |
| 5,961,088 | A * | 10/1999 | Chabanne | B60N 2/01525 248/429 |
| 2007/0090261 | A1 * | 4/2007 | Mehujas | B64D 11/0696 248/429 |
| 2010/0001546 | A1 * | 1/2010 | Christensen | B64D 11/0696 296/65.13 |
| 2010/0074680 | A1 * | 3/2010 | Vine | B64D 11/0696 403/300 |
| 2010/0096502 | A1 | 4/2010 | VanderWolk | |
| 2011/0309195 | A1 * | 12/2011 | Bishop | B64C 1/20 244/118.6 |
| 2014/0077577 | A1 * | 3/2014 | Gensch | B64D 11/0696 297/463.1 |
| 2015/0145300 | A1 * | 5/2015 | Finlay | B64D 11/0696 297/257 |
| 2015/0192162 | A1 * | 7/2015 | Jones | B64D 11/0696 403/27 |
| 2016/0031560 | A1 | 2/2016 | Zheng et al. | |
| 2017/0275003 | A1 * | 9/2017 | Erhel | B60N 2/14 |
| 2018/0370635 | A1 * | 12/2018 | Itzinger | B60N 2/3065 |

OTHER PUBLICATIONS

Search Report from First Office Action for Chinese Application No. 201780034558.3 dated Jun. 30, 2021; 3 pages (page 1 categorizing the cited art).

* cited by examiner

PASSENGER SEAT SYSTEM FOR A CABIN OF A MEANS OF TRANSPORTATION

CROSS-REFERENCE TO RELATED APPLICATIONS

The present application is a national phase entry under 35 U.S.C. § 371 of International Application No. PCT/EP2017/063153 filed May 31, 2017, which claims priority from German Patent Application No. 102016110057.9 filed May 31, 2016, all of which are incorporated herein by reference.

TECHNICAL FIELD

The invention relates to a passenger seat system for a cabin of a means of transportation, to a cabin having at least one seat system of this kind, and to an aircraft having a cabin of this kind.

BACKGROUND OF THE INVENTION

In vehicles which are used for carrying passengers, passenger seats and other fittings are usually fastened to floor rails, which have fastening means arranged in a certain grid pattern. By means of the grid pattern, it is possible to implement different fastening positions on the floor rails. The object concerned is usually fastened at a desired position by means of a locking device, which performs long-term positive and/or nonpositive locking to fastening means at one position on the floor rail.

There is furthermore a known practice, especially in aircraft, of determining a spacing between seats situated one behind the other in a longitudinal direction and, where appropriate, occasionally or regularly changing this spacing, depending on feasibility from the point of view of legal certification and time, in accordance with demand or temporary requirements. For this purpose, the locking devices of relevant seats are released, and the seats are then moved along the floor rail, and the locking devices are locked again. Changing the spacing, especially between two passenger seats arranged one behind the other, can change the seating category of the relevant section in the passenger cabin.

DE 10 2009 004 987 B4 shows a movable seat for a means of transportation, having a seat frame for movable mounting on a support structure of the means of transportation, wherein the seat is embodied in such a way that two seats arranged one behind the other in the means of transportation have a smaller joint footprint in a state of storage, in which they are pushed together and at least partially nested, than in a state of use, in which they are pushed apart.

DE 10 2013 103 662 A1 shows a retaining device for fastening passenger seats in a means of transportation, said device having a seat leg fixing element, a sliding element and a rail element.

SUMMARY OF THE INVENTION

It is the object of the invention to propose an arrangement or a passenger seat for improving rapid reconfiguration of a cabin of a means of transportation without compromising passenger comfort.

The proposal comprises a passenger seat system for a cabin of a means of transportation, having at least one passenger seat, which has a seat frame, which has a holding section for holding seat fittings and has a plurality of supporting elements for coupling to a floor, and, for each passenger seat, at least one slide device, which is spaced apart from the holding section and which has a base and a retaining device, which can be detachably fastened to the base and can be coupled to a supporting element of the seat frame. The base has a bearing surface for placement on or integration into a seat rail in the cabin of the means of transportation and at least one locking device for locking the base on the seat rail. The base has a holding device for releasably holding the retaining device. The slide device is designed to lock the retaining device selectively in a first position or a second position on the holding device or to release the retaining device and, when the retaining device is released, to allow movement of the retaining device between the first position and the second position.

The passenger seat system according to the invention is used to form one or more passenger seats which are capable of being fastened at two different positions along the seat rail in a longitudinal direction of the cabin when required, that is to say in the first or the second position. The selective positioning makes it possible to widen or reduce the spacings between passenger seats in the longitudinal direction when required. Here, the term "passenger seat" does not necessarily have to refer exclusively to a single seat but can also denote a row of passenger seats comprising a plurality of individual seats adjacent to one another on a common seat frame. The core component features that are required for this purpose according to the invention are explained below.

A seat frame is a very robust frame for holding seating surfaces and backrests and forms a base frame for a seat or a row of seats. By way of example, a seat frame has two groups, each comprising a front seat leg, a rear seat foot and a diagonal strut extending between them, wherein each group of these components defines an area extending vertically with respect to a cabin floor. The two groups are spaced apart and jointly carry a front and a rear supporting tube, which are spaced apart from a cabin floor and serve to hold seat cushions and to hold a backrest, in particular a pivotable backrest. The seat frames are usually of such robust construction that all the weight and mass forces from people sitting thereon are transmitted via the seat frame into the seat rails supporting the seat frame, wherein load factors relevant for certification have to be taken into account. Of course, seat frames for certain means of transportation can also be configured in a way that is completely different from this. However, all seat frames should have in common that there are supporting elements which support a holding section on which the actual components that come into contact with a passenger are then supported. A holding section can be provided by said supporting tubes and fastening means arranged thereon, or by some other suitable elements.

A device referred to as a slide device can consist of two interconnected components capable of coupling a supporting element mechanically to the seat rail. Coupling takes place in a variable position by means of a base of the slide device, said base being positioned in a fixed manner on or in the seat rail, and by means of the retaining device locked thereon at one of two positions determined by the base. Irrespective of the manner of embodiment of the base and of the configuration of the retaining device, this is intended to enable shifting or movement of the relevant passenger seat between two positions when required without the need for the seat rail itself to be designed or to have appropriate means for this purpose. It is particularly advantageous if the slide device is an integral part of a passenger seat in order to allow rapid modification of a configuration simply by integrating the relevant passenger seat into a means of transportation with conventional seat rails. Modifications to the means of transportation or to the seat rails located therein are not necessary.

The base and the retaining device can also extend in the form of separate components at different positions of the relevant seat frame. For example, part of the seat frame could be mounted in such a way as to be movable along the seat rail, and another part of the seat frame could be capable of being fastened in two discrete positions on the seat rail.

Consequently, it could also be conceivable to convert already available passenger seats by coupling to such a slide device to enable all the associated advantages to be exploited. The retaining devices which are present on or connected to a conventional seat frame can be replaced by a slide device, or the base of a slide device can be embodied in such a way that a conventional retaining device can be combined therewith. To compensate for a change, resulting from the slide device, in the height of the seat frame and hence of the center of gravity of a combination of the passenger seat and the passenger, it might be necessary for reasons relevant to certification to adapt the height of the seat frame.

The rapid reconfigurability of a passenger seat arrangement by means of passenger seats which are constructed with the aid of the passenger seat system according to the invention is reflected in the simplicity of implementing variable seat spacings. If, for instance, passenger numbers in the means of transportation concerned are small, the seat spacings could be increased, ensuring that the passengers experience enhanced personal comfort. In this case, the passenger seats are shifted successively from a respective individual first position to an individual second position, with the result that the spacing with respect to the passenger seat in front or behind is increased by a certain distance. Here, the capacity for shifting or movement that can be achieved by means of the respective base depends on the ordinal number of the relevant passenger seat in the group concerned. Starting from a first passenger seat in the group, the shifting or movement distance allowed by the base, which is the spacing between the first position and the second position, is increased successively by an enlargement distance for each passenger seat positioned along the seat rail. Here, the enlargement distance denotes the difference between a first seat spacing and a second seat spacing. Possible configurations to achieve this aim are discussed in further detail below.

Overall, the passenger seat system according to the invention thus has the effect of providing an easily retrofitted and very flexible solution which allows variable seat spacings in a passenger cabin of a means of transportation and, in particular, of a passenger aircraft.

In an advantageous embodiment, the base has a first end and a second end, on each of which a stop for defining the first position and the second position is arranged. The shifting of passenger seats for rapid reconfiguration, e.g. immediately between two deployments of the means of transportation, can be performed by on-board personnel. Particularly in the case of relatively large means of transportation, e.g. passenger aircraft, a large number of passenger seats can be shifted in a short time.

To enlarge or reduce seat spacings, the passenger seats should be shifted in groups, wherein each passenger seat of such a group is shifted by a different amount owing to the progressive addition of enlargement distances. Even if seat spacings are not changed regularly, on-board personnel could always carry out the corresponding routine for checking the end positions of the individual seats which are to be set. The integration of end stops on each individual base makes shifting significantly easier for on-board personnel since, when an end stop is reached, not only is a precise end position reached but a clear haptic feedback is given to the respective user.

The holding device of the base could have a rail segment, wherein the retaining device is designed for arrangement on the rail segment in a manner flush with the surface. The rail segment can be embodied either as a "Douglas rail" or a similar design or in the form of a slide rail, on which the retaining device can slide between the first and the second position. Consequently, the embodiment of the base can be restricted to a rail segment, which preferably has an end stop at both ends.

In a particularly advantageous embodiment, the rail segment has a profile cross section having an undercut, wherein the retaining device has a correspondingly shaped recess. The at least one undercut can extend along the rail on side faces of the rail segment and preferably symmetrically on both side faces of the rail segment, resulting in a kind of dovetail guide together with the recess of the retaining device. This prevents the retaining device from being lifted off the rail segment, and therefore all that is required to lock the retaining device on the base is to use a pin or the like projecting into a latching opening of the rail segment. This makes the shifting of the respective passenger seat particularly simple, and both the release and the locking of the passenger seat in the position attained is made significantly easier.

In this context, it is conceivable for the rail segment to have latching openings only at its ends, which correspond in the first position and in the second position, thus excluding incorrect positioning and locking of the passenger seat.

As an alternative to the use of a rail, it would also be conceivable for the holding device of the base to have a toggle link, which is mounted in such a way as to be pivotable about a joint arranged on the base and can be pivoted onto the base into two positions that are opposed by 180°, wherein the relevant supporting element of the seat frame is connected at an end remote from the joint. The toggle link is implemented like a rocker pendulum, which is pivoted either to the first position or to the second position and is preferably locked there. The position of the toggle link is always precisely defined and incorrect locking is not possible. For the individual passenger seats in a relatively large group of passenger seats, the length of the toggle links should be adapted to the specific displacement paths.

Both a front part of the seat frame and a rear part can be fitted with a toggle link of this kind. As a preferred option, either two adjacent front seat legs or two rear seat feet are fitted with a toggle link of this kind, while the other side of the seat frame can in each case be guided along the seat rail. It is particularly expedient to fit each of the front seat legs with a toggle link and to couple the rear seat feet movably to the seat rail in order to assist tilting around the toggle link by exploiting a lever arm provided by the backrest of the seat on the seat frame concerned.

To this effect, the slide device can also be implemented in the form of a guide in the seat rail, while the retaining device is implemented by means of the toggle link, and the seat rail itself or components that can be mounted thereon or, alternatively, integrated therein act as the base in accordance with the invention.

The locking device of the base could have two locking means, which are designed to enter into a positive and/or non-positive joint with the seat rail. Depending on the embodiment of the seat rail, the second locking means are embodied either as mushroom-type locking means with a stem, which can be moved along the stem perpendicularly to the cabin floor, when using a "Douglas rail" for instance, or in the form of pins which can be inserted into latching openings of the rail if instead slide rails are used. It is absolutely essential that the base should be connected firmly enough to the seat rail since all the loads of the passenger seat concerned are introduced into the seat rail via said base. The second locking means can correspond to tried and tested locking means that are used for direct connection of passenger seats and seat rails.

It is advantageous if the seat frame has four supporting elements, to each of which a dedicated slide device is assigned. These four supporting elements can comprise two front seat legs and two rear seat feet, which form all the bearing points of the seat frame. Fitting each individual supporting element with a slide device makes it possible to minimize the overall weight of a passenger seat since the slide devices required for this purpose can have the minimum possible size.

The passenger seat system can have at least one group of passenger seats. The spacing between the first position and the second position of the at least one slide device is increased for each passenger seat of the group by a multiple of a distance which corresponds to a predetermined seat spacing increase in the group of passenger seats, wherein the respective multiple corresponds to an ordinal number of the relevant passenger seat in the group. If a group of passenger seats is subject to a seat spacing enlargement, the seat spacings between two passenger seats arranged one behind the other are increased by a certain enlargement distance. If one passenger seat of the group remains at its original location, the directly adjoining passenger seat must be shifted by a distance which corresponds precisely to the enlargement distance of the seat spacing. As a result, the passenger seat which is then shifted moves closer to the next passenger seat in this group, which consequently must be moved by the original distance in order to assume the original seat spacing. To enlarge the seat spacing thereof, the enlargement distance must consequently be added again to ensure that this passenger seat also has an increased seat spacing. The passenger seat which then follows must consequently be moved by triple the enlargement distance etc. The ordinal number of the passenger seat concerned consequently corresponds to the sequence of passenger seats to be shifted. The passenger seat to be moved only by the enlargement distance consequently has the ordinal number 1, the following passenger seat has the ordinal number 2 etc. Consequently, enlargement of the seat spacing cannot be unlimited since the space within the cabin of the means of transportation is limited.

A group of passenger seats which can undergo enlargement of the seat spacing can advantageously have between three and twelve passenger seats. An installation space of, for example, twelve inches can be achieved by pushing one passenger seat up close to and almost flush with another passenger seat in the case of an originally generous seating density, thus making it possible to achieve enlargement of the seat spacings by in each case one inch in the case of a group of twelve passenger seats. The passenger seat to which the other passenger seats have been moved up close then remains unused. For a group of three passenger seats, a significantly more generous enlargement of the seat spacing could be implemented and, at the same time, such a small group size also allows individual enlargement of the seat spacing in the case of a seating density which is originally quite close.

As explained above, one passenger seat in a group of passenger seats can remain unused when the seat spacing is enlarged. It is advantageous if one group has a conventional passenger seat which can be connected directly to the seat rail and does not have a slide device. A passenger seat of this kind is always intended to remain unused when the seat spacing is enlarged. As an alternative, this passenger seat can also be removed completely from the cabin or folded up when the seat spacing is enlarged, thus freeing the installation space originally occupied by this passenger seat for all the other passenger seats of the group.

It is furthermore conceivable that the slide device is additionally designed to lock the retaining device selectively in a third position on the holding device or to release the retaining device and, when the retaining device is released, to allow movement of the retaining device between the first position, the second and the third position. This can be achieved, in particular, by means of a rail segment which also provides a third position between a first position and a second position.

The invention furthermore relates to a cabin for a means of transportation, having a floor, at least one seat rail arranged in or on the floor, and an arrangement, formed on the seat rail, of passenger seats, which are formed by means of a passenger seat system described above.

The cabin can have at least one group of passenger seats, wherein one passenger seat of the group does not have a slide device, is arranged directly on the at least one seat rail, and when seat spacings of the other passenger seats of the group are enlarged, remains in its position or can be removed from the cabin.

Finally, the invention relates to an aircraft, having an aircraft fuselage with a cabin described above formed therein.

BRIEF DESCRIPTION OF THE DRAWINGS

Further features, advantages and possible uses of the present invention will be found in the following description of the embodiment examples and the figures. In this context, all the features described and/or depicted form the subject matter of the invention in themselves or in any combination, irrespective of the way they are combined in the individual claims or the dependency references thereof. In the figures, identical reference signs furthermore stand for identical or similar objects.

FIGS. 8a to 9b show further details of the locking means from FIGS. 6a and 6b.

DETAILED DESCRIPTION OF EMBODIMENT EXAMPLES

Figure 1A:
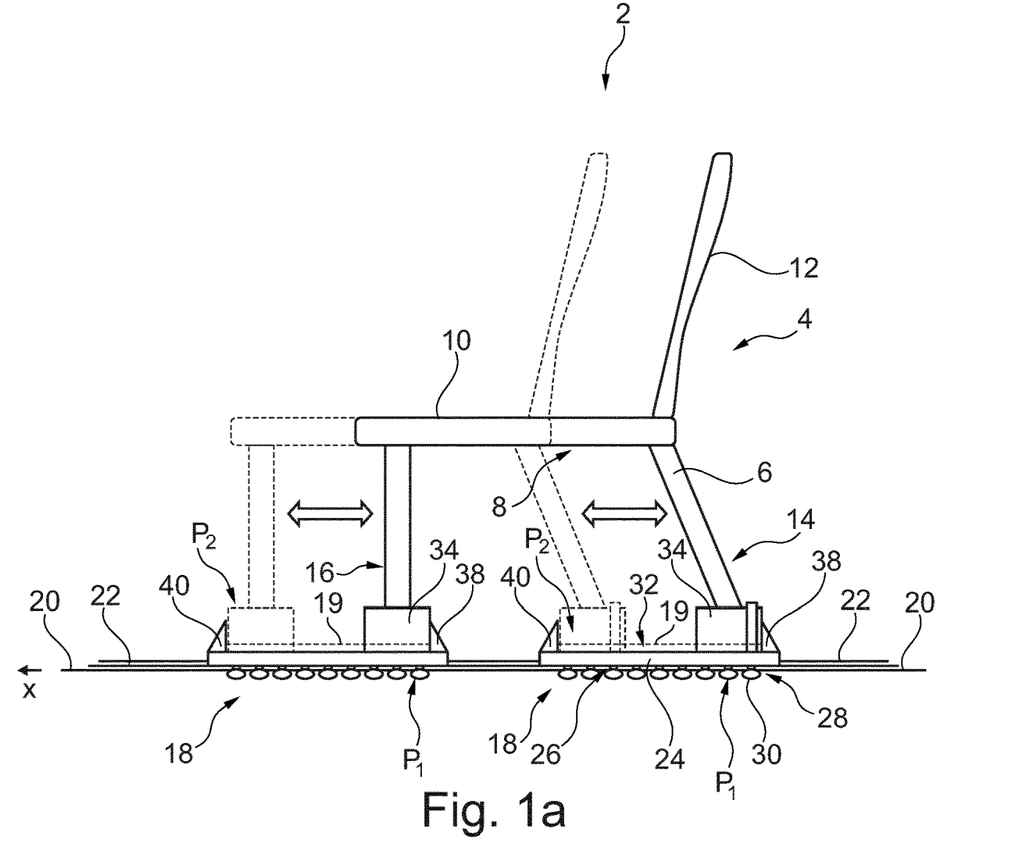
FIG. 1a shows a passenger seat or a passenger seat system which forms a passenger seat, in a schematic side view.

FIG. 1a shows a passenger seat system 2 having a passenger seat 4 illustrated in a very schematic way, which has a seat frame 6 that has a holding section 8 for holding seat fittings 10 and 12 in the form of a seat cushion and a backrest. Supporting elements 14 and 16 of the seat frame 6 in the form of rear seat feet 14 and front seat legs 16 are mechanically coupled by means of a slide device 18 to a floor 20 or to a seat rail 22 installed on, in or on top of said floor, ensuring that the seat frame 6 is firmly connected to the seat rail 22.

A slide device has a base 24, which has a bearing surface 26 that can be placed on the seat rail 22. The base 24 can be locked to it by means of a locking device 28 having first locking means 30. The first locking means 30 illustrated can be implemented in the form of conventional, mushroom-type locking elements having a disc-shaped enlarged portion and a stem, as customarily used on seat rails of the "Douglas rail" type for locking passenger seats.

The passenger seat system 2 according to the invention is suitable particularly as a retrofit solution for already existing cabins of means of transportation and especially passenger aircraft, and therefore the equipment in the form shown can be a very advantageous embodiment example. Of course, other forms of seat rail and other suitable locking means that do not correspond to the locking means shown here are also conceivable without departing from the core concept of the invention.

The base 24 has a holding device 32 for detachably holding a retaining device 34, which can be fastened at a first position P1 or at a second position P2. The holding device can have a rail or a rail segment 19, for instance, on which it is possible to slide the retaining device 34. The retaining devices 34, which are arranged on a rearward end of the passenger seat 4, could be connected to the holding device 32 by means of second locking means 36 in such a way that further sliding of the respective retaining device 34 is not possible.

At its rearward end, the base 24 has a first stop 38 and, at its front end, it has a stop 40. To move the retaining device 34 forwards into surface contact with stop 40, the second position is adopted. In the case of a rearward movement, the first position is adopted when the retaining device 34 enters into surface contact with stop 38. The same applies to the retaining device 34 at the front end of the passenger seat 4.

Figure 1B:
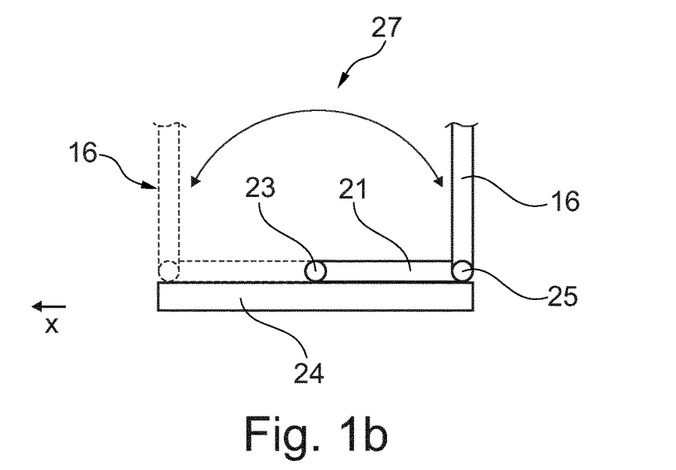
FIG. 1b shows an alternative variant for movement between a first and a second position.

In an alternative configuration of a slide device 27, which is shown in FIG. 1b, a toggle link 21 is mounted in such a way as to be pivotable about a joint 23 secured on the base 24 and can be pivoted into two positions that are 180° apart. At an end 25 remote from the joint 23, a front seat leg 16 is coupled here as a supporting element, and therefore the toggle link 21 serves as a retaining device. Consequently, the front seat leg 16 can be moved accurately into two different positions. There, locking can take place by means of locking means (not shown). This variant has the particular advantage that the use of a toggle link 21 already enables forces to be absorbed or transmitted in the longitudinal direction x.

The passenger seat system 2 makes it possible to provide passenger seats which allow enlargement of a seat spacing between a plurality of passenger seats 4 arranged one behind the other when required. Here, in FIG. 2, a row of passenger seats 4 totaling four seats, which are at a relatively small seat spacing S1, is illustrated. The use of slide devices 18a and 18b, as illustrated in the lower part of FIG. 2, enables the seat spacings of the three front passenger seats 4 to be enlarged by moving the second passenger seat from the left away from the front passenger seat 4, e.g. by 3 inches, and the next passenger seat 4 by 6 inches. The last passenger seat 4 in the row now has a seat spacing which is 6 inches smaller than before and should therefore remain unused.

Figure 2:
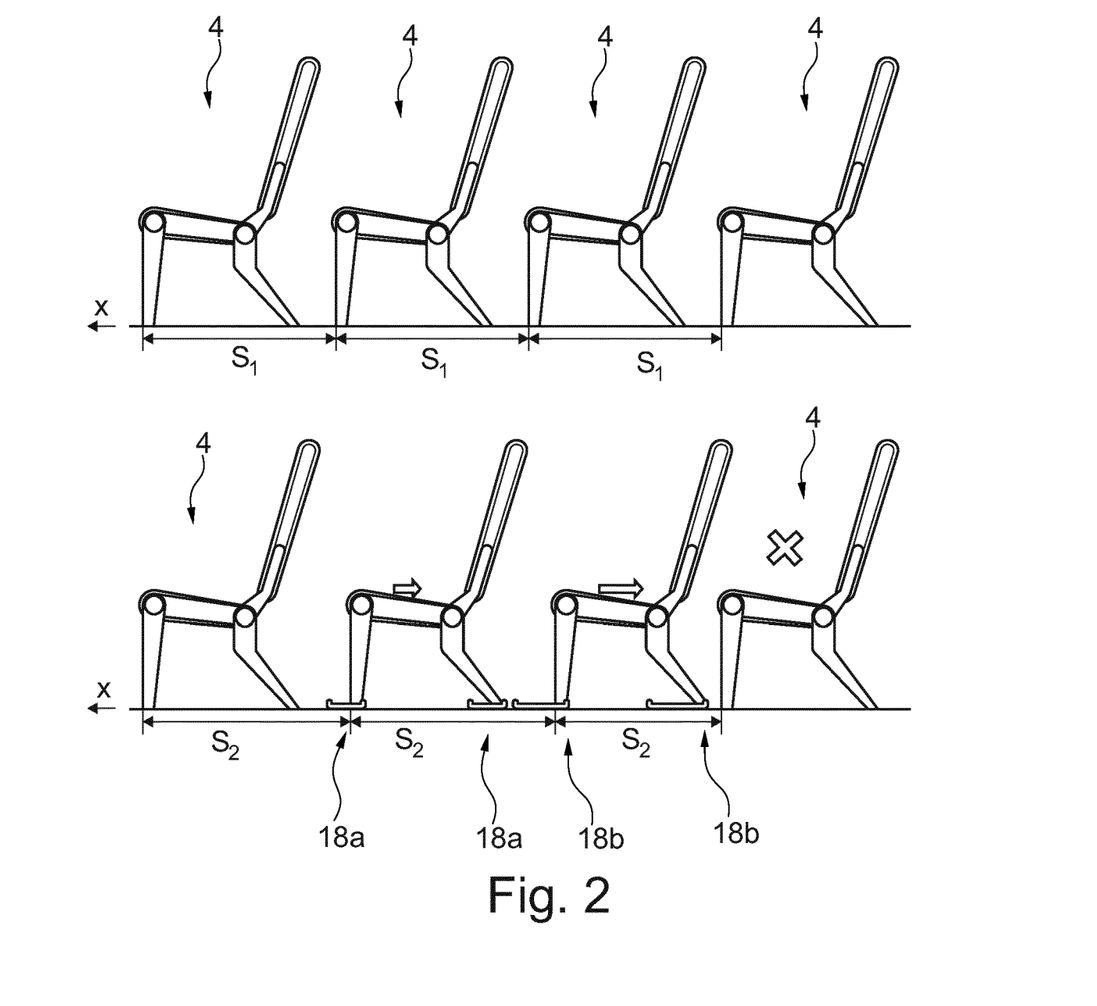
FIG. 2 shows a group of passenger seats in a comparative side view with a fixed seat spacing and with a variable seat spacing when equipped with a slide device.

The slide devices 18a and 18b are adapted to their predetermined displacement path, and therefore the front slide device 18a is made 3 inches shorter than the slide device 18b of the passenger seat 4 situated behind it.

Figure 3:
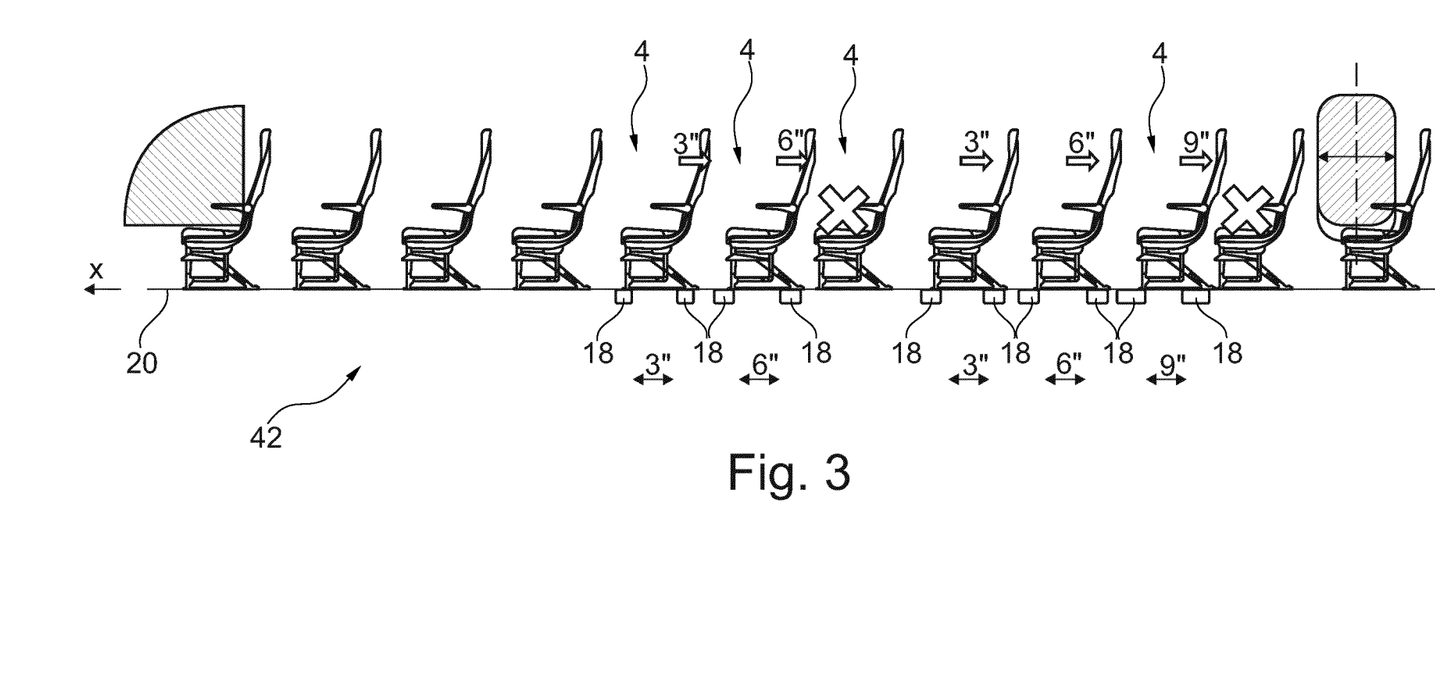
FIG. 3 shows a group of passenger seats in a cabin of an aircraft in a side view.

FIG. 3 shows a cabin 42 with a row of passenger seats 4, the seat spacings of which can be enlarged when required. Here, by way of example, a displacement of 3, 6 and 9 inches of three passenger seats situated one behind the other is to be performed, wherein a fifth passenger seat situated behind these becomes unusable owing to the fact that the seat spacing is too small at this location.

Figure 4:
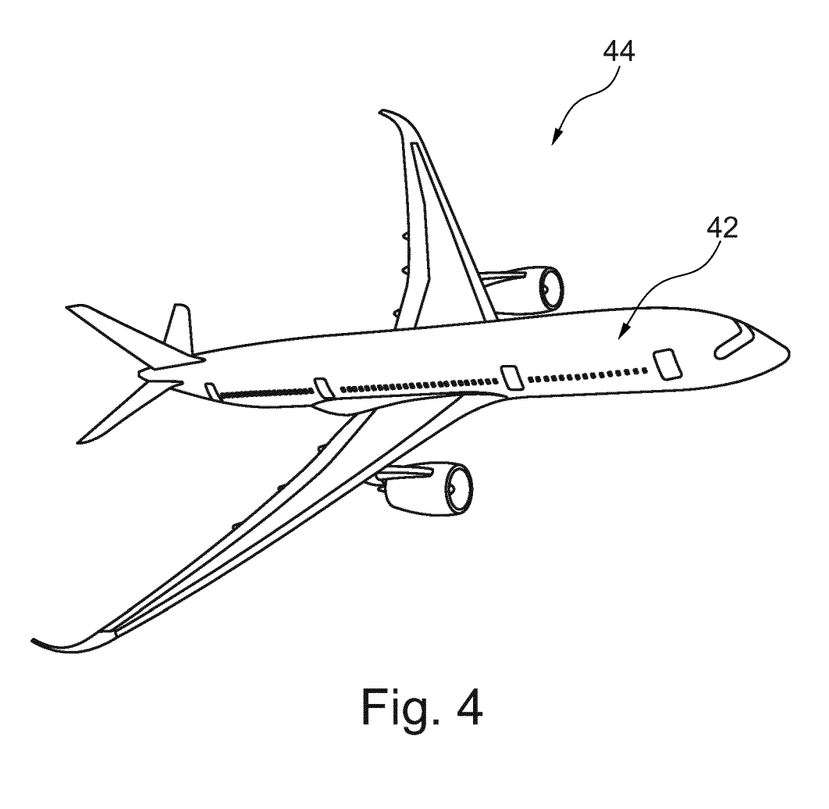
FIG. 4 shows an aircraft having a fuselage and a cabin, formed therein, as shown in FIG. 3.

FIG. 4 shows an aircraft 44 with a cabin 42 arranged therein in accordance with the previous illustration.

Figure 5A:
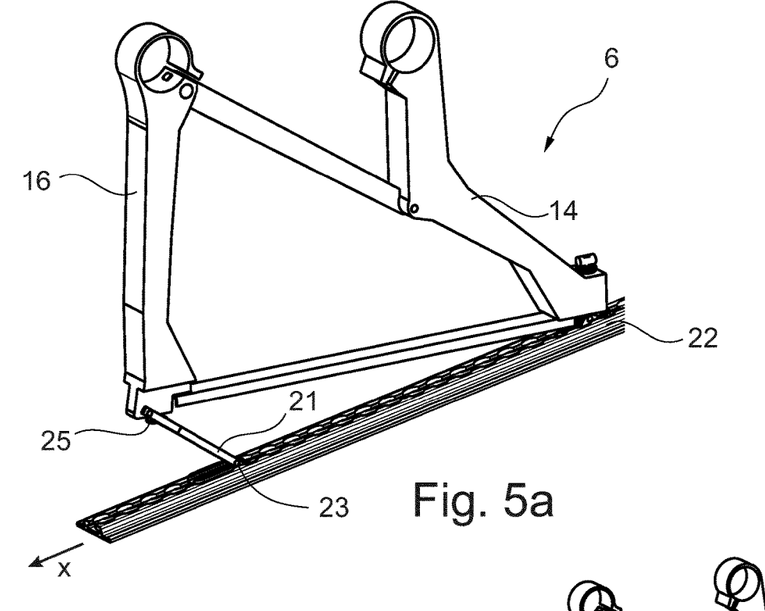
FIGS. 5a to 5c show the principle shown in FIG. 1b in a different representation.
Figure 5B:
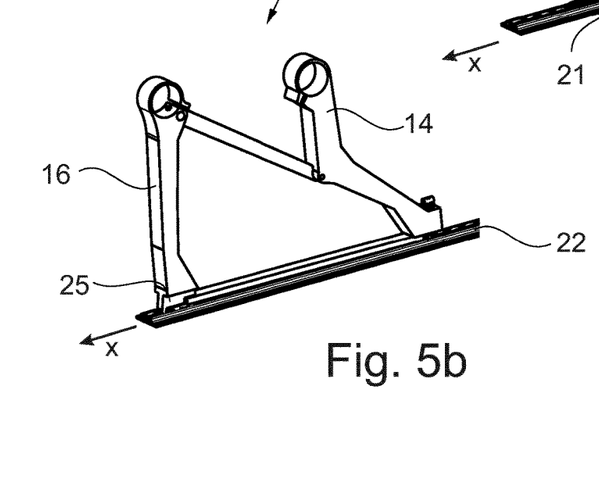
Figure 5C:
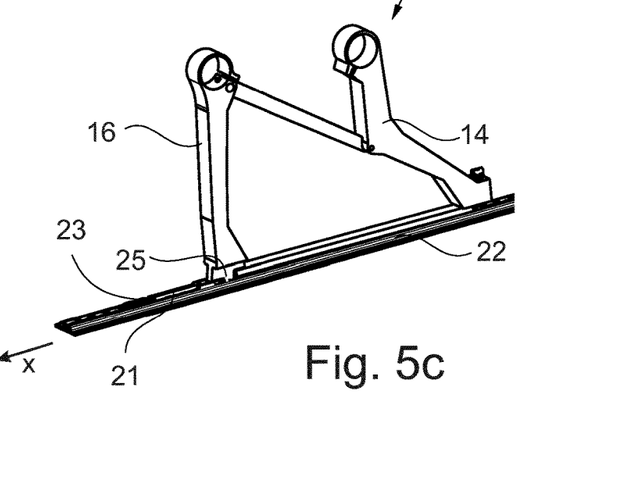

FIGS. 5a to 5c show the principle from FIG. 1b in a somewhat clearer illustration. In FIG. 5a, the seat frame 6 is illustrated in a transitional position between two relative positions along the rail 22, in which the front seat leg 16 is raised somewhat from the rail 22, while the rear seat foot rests on the rail 22, and the toggle link 21 extends obliquely from the rail to the joint 23. FIG. 5b shows a position of the seat frame 6 facing forwards, i.e. in the x direction, while FIG. 5c shows a position of the seat frame 6 facing rearwards, i.e. counter to the x direction.

The use of the toggle link 21 enables the spacing between the two possible positions of the seat frame 6 on the seat rail 22 to be accurately specified. It is conceivable, for the purpose of changing the position of the seat frame 6, to raise the front seat leg 16 slightly and push it slightly in the desired direction, such that, owing to the guidance with the aid of the toggle link 21, the seat frame 6 assists the movement by virtue of gravity until the desired position has been reached. To raise the front seat leg 16, an upper edge of the backrest 12 can be pulled backwards behind the seat frame 6 concerned, for example, after corresponding locking of the front seat leg 16 has been released.

Figure 6A:
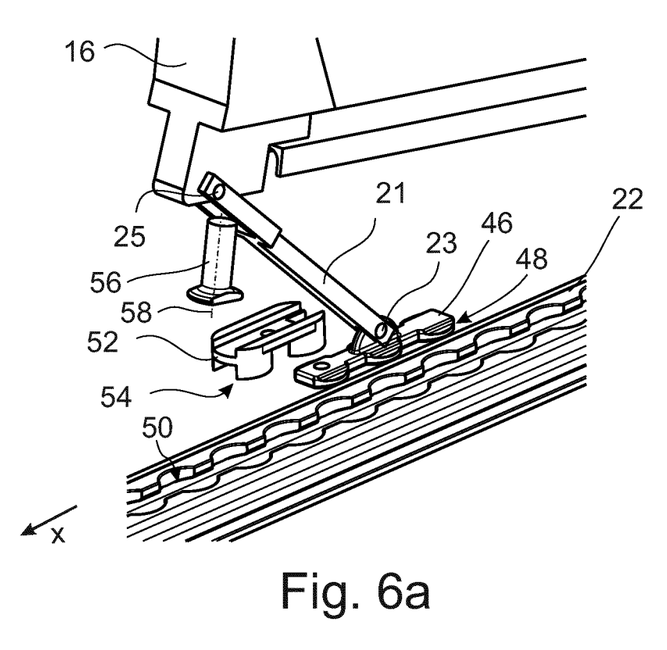
FIGS. 6a and 6b show locking means for the front seat leg and the rear seat foot.

FIG. 6a shows one possible variant for fastening the joint 23 of the toggle link 21 to the rail 22. For this purpose, for example, an insert 46 having, by way of example, three projections 48 corresponding to openings 50 in the rail 22 is provided, thus enabling the insert 46 to be inserted into an inner cavity of the rail 22. By means of a counter element 52, which likewise has projections 54, which can be inserted into the openings 50 in the rail 22, but can also simultaneously bring about positive engagement with the insert 46, the insert 46 can be locked in the rail 22. Consequently, the combination of the insert 46 and the counter element 52 can be a base in the sense according to the invention. In addition, an additional locking means 56 can be employed to secure the front seat leg 16 of the seat frame 6, the said locking means being shown only schematically and being lockable on the rail 22 by rotation about the longitudinal axis 58. By means of rotatable mounting on the front seat leg 16, a releasable positive joint between the front seat leg 16 and the rail 22 is thus established.

Figure 6B:
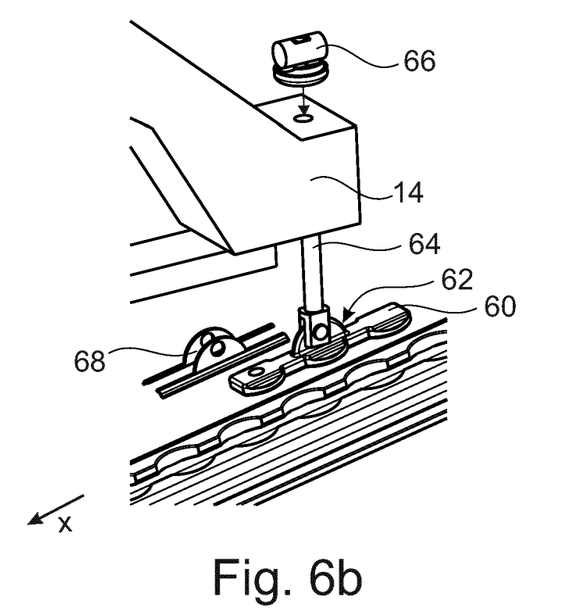

The rear seat foot 14 can be locked on the rail 22 in a similar way. For this purpose, by way of example, use is made of an insert 60 which comprises a rotatable cam 62, which can be rotated when required by means of a connecting shaft 64 arranged in an articulated manner and an operating element 66. By rotation, the cam 62 can be locked or released in a cavity of the rail 22. To prevent accidental rotation, a counter element 68 can be inserted into the rail 22. The articulated connection to the connecting shaft 64 allows slight rotation of the rear seat foot 14 about a horizontal axis extending transversely to the rail 22 when raising the front seat leg 16. In a released state of the cam 62, the rear seat foot can be guided along the seat rail 22. The arrangement on one or more seat feet 14 can therefore also be understood as a slide device, while the arrangement on the front seat legs 16 should be understood more as a retaining device in the sense according to the invention.

Figure 7:
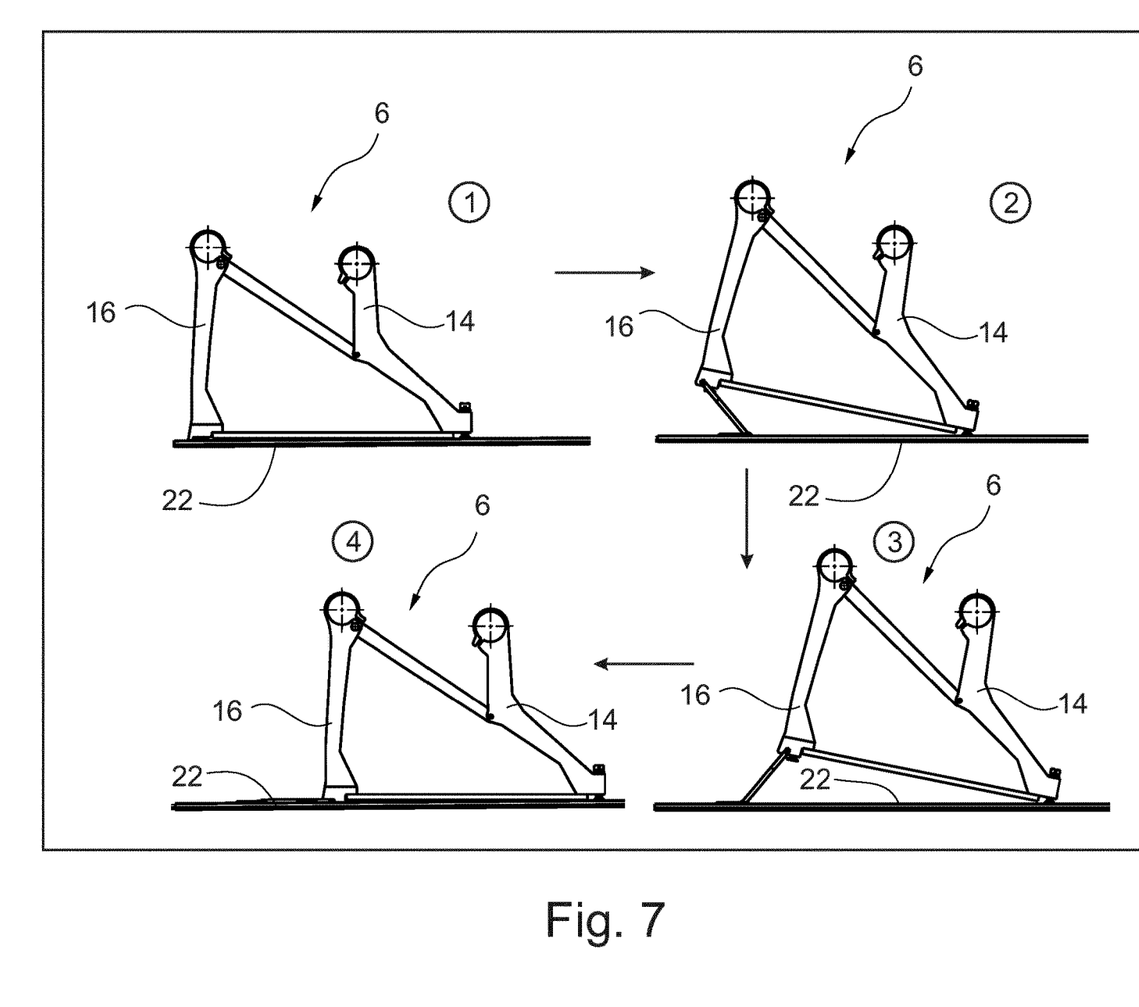
FIG. 7 shows a movement of the seat frame with a toggle link arranged thereon.

FIG. 7 shows, in four successive illustrations 1) to 4), a change in the position of a seat frame 6 on a rail 22 as described above. In partial illustration 1), the front seat leg 16 is raised, in 2) sliding in the desired direction begins, in 3) the gravity-assisted progress of the movement of the seat frame takes place and, in 4), the end position is reached.

Figure 8A:
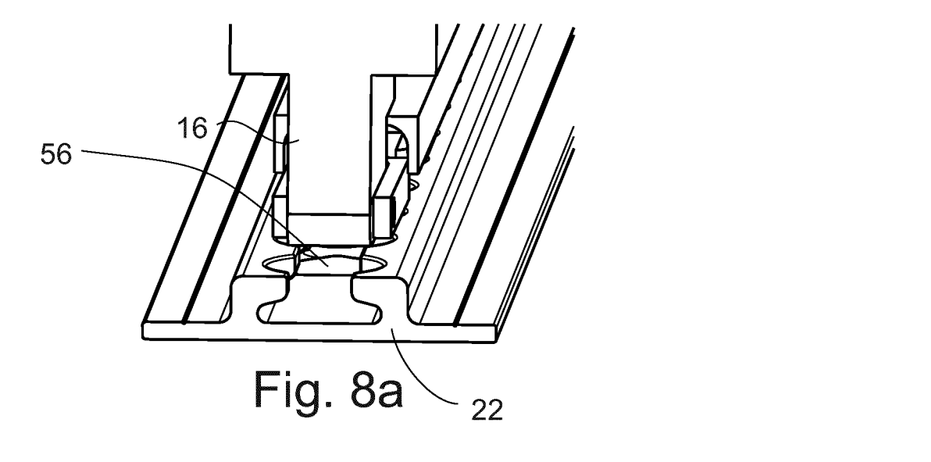
Figure 8B:
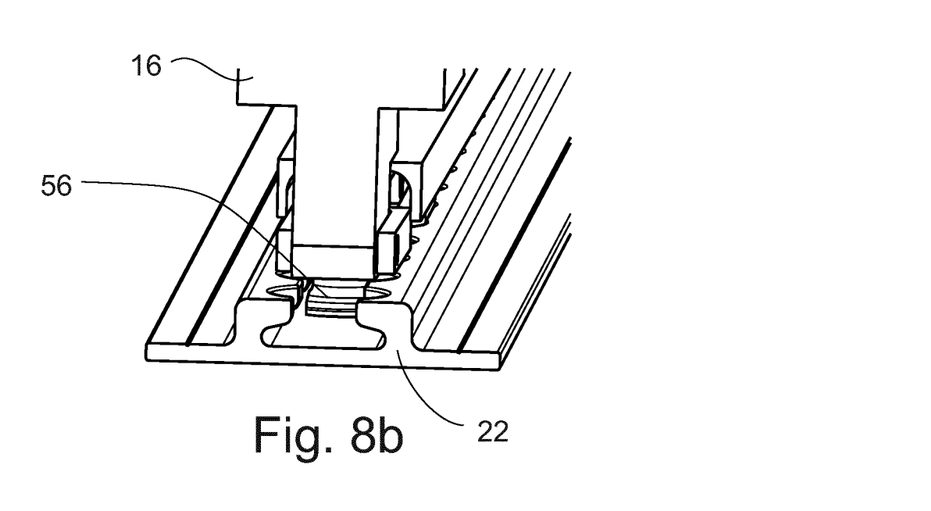

FIGS. 8a and 8b show the rotation of the locking means 56 of the front seat leg 16 for fastening (FIG. 8a) and for releasing (FIG. 8b) the seat leg 16 to and from the rail 22.

Figure 9A:
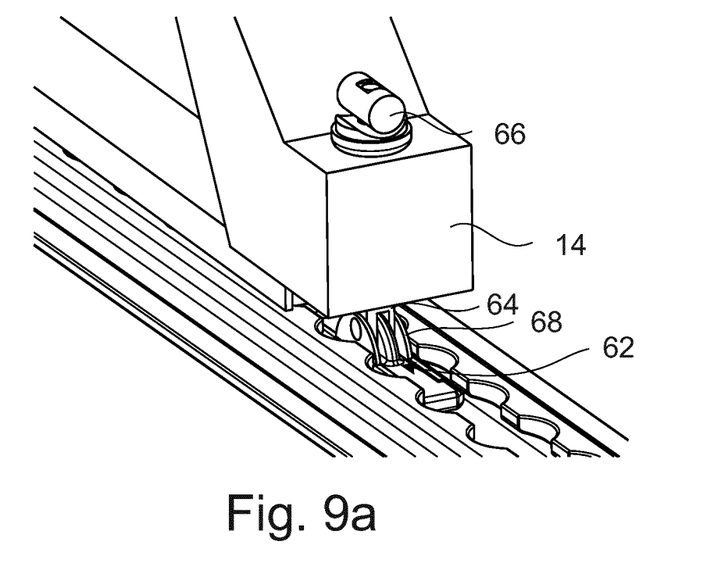
Figure 9B:
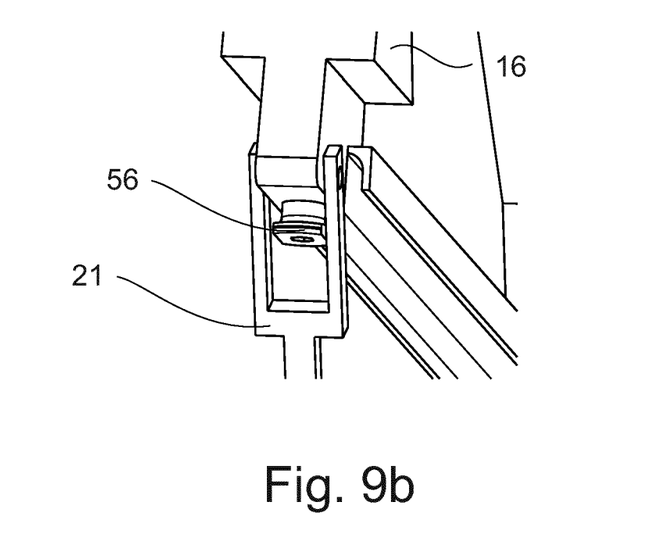

FIG. 9a shows a locking position of the cam 62 in the rail with the counter element 68 inserted. FIG. 9b simultaneously illustrates a raised front seat leg 16, in which the locking element 56 is in an unlocked position. Even in the locking position shown in FIG. 9a, the cam 62 of the rear seat foot 14 can also tolerate a slight rotation about a horizontal pivoting axis extending transversely to the seat rail 22 since the connecting shaft 64 can pivot about said axis and the counter element 68 does not counteract this.

In addition, it should be mentioned that "having" does not exclude any other elements or steps and "a" or "an" does not exclude a multiplicity. It should furthermore be mentioned that features which have been described with reference to one of the above embodiment examples can also be used in combination with other features of other embodiment examples described above. Reference signs in the claims should not be regarded as restrictive.

The invention claimed is:

1. A passenger seat system for a cabin of a means of transportation, comprising:
at least one passenger seat having a seat frame having a holding section for holding seat fittings and a plurality of supporting elements for coupling to a floor, the plurality of supporting elements comprising a first front seat leg and a first rear seat leg; and
for each passenger seat, at least one slide device spaced apart from the holding section and having a base and a retaining device configured to be detachably fastened to the base and to be coupled to a supporting element of the seat frame, the at least one slide device comprising a first slide device associated with the first front seat leg and a second slide device associated with the first rear seat leg,
wherein the base has a bearing surface for placement on or integration into a seat rail in the cabin of the means of transportation and at least one locking device for locking the base on the seat rail,
wherein the base has a holding device for releasably holding the retaining device, and
wherein the at least one slide device is configured to lock the retaining device selectively in a first position or a second position on the holding device or to release the retaining device and, when the retaining device is released, to allow movement of the retaining device, on the at least one slide device, between the first position and the second position.

2. The passenger seat system as claimed in claim 1, wherein the base has a first end and a second end, each of the first end and the second end having a stop for defining the first position and the second position arranged thereon.

3. The passenger seat system as claimed in claim 1, wherein the holding device of the base has a rail segment.

4. The passenger seat system as claimed in claim 1, wherein the plurality of supporting elements further comprises a second front seat leg and a second rear seat leg and wherein the at least one slide device further comprises a third slide device associated with the second front seat leg and a fourth slide device associated with the second rear seat leg.

5. The passenger seat system as claimed in claim 1, further comprising:
at least one group of passenger seats,
wherein the spacing between the first position and the second position of the at least one slide device is increased for each passenger seat of the group by a multiple of a distance corresponding to a predetermined seat spacing increase in the group of passenger seats, wherein the respective multiple corresponds to an ordinal number of the relevant passenger seat in the group.

6. The passenger seat system as claimed in claim 5, wherein the group has between three and twelve passenger seats.

7. The passenger seat system as claimed in claim 5, wherein the group further comprises a passenger seat, configured to be connected directly to the seat rail and not having a slide device.

8. A cabin for a means of transportation, comprising:
a floor;
at least one seat rail arranged in or on the floor; and
an arrangement, formed on the seat rail, of passenger seats formed by means of a passenger seat system as claimed in claim 1.

9. The cabin as claimed in claim 8, further comprising:
at least one group of passenger seats, wherein one passenger seat of the group does not have a slide device, is arranged directly on the at least one seat rail, and when seat spacings of the other passenger seats of the group are enlarged, remains in its position.

10. An aircraft having an aircraft fuselage with a cabin as claimed in claim 8 formed therein.

11. A passenger seat system for a cabin of a means of transportation, comprising:
at least one passenger seat having a seat frame having a holding section for holding seat fittings and a plurality of supporting elements for coupling to a floor; and
for each passenger seat, at least one slide device spaced apart from the holding section and having a base and a retaining device configured to be detachably fastened to the base and to be coupled to a supporting element of the seat frame,
wherein the base has a bearing surface for placement on or integration into a seat rail in the cabin of the means of transportation and at least one locking device for locking the base on the seat rail,
wherein the base has a holding device for releasably holding the retaining device,
wherein the at least one slide device is configured to lock the retaining device selectively in a first position or a second position on the holding device or to release the retaining device and, when the retaining device is released, to allow movement of the retaining device between the first position and the second position, wherein the holding device of the base has a toggle link mounted in such a way as to be pivotable about a joint arranged on the base and configured to be pivoted onto the base into two positions that are opposed by 180°, and wherein a relevant supporting element of the plurality of supporting elements is connected at an end remote from the joint.

\* \* \* \* \*